July 29, 1969    J. L. DURKEE ET AL    3,457,717
PLASTIC COATED CABLE AND METHOD OF MAKING SAME
Filed Aug. 2, 1968
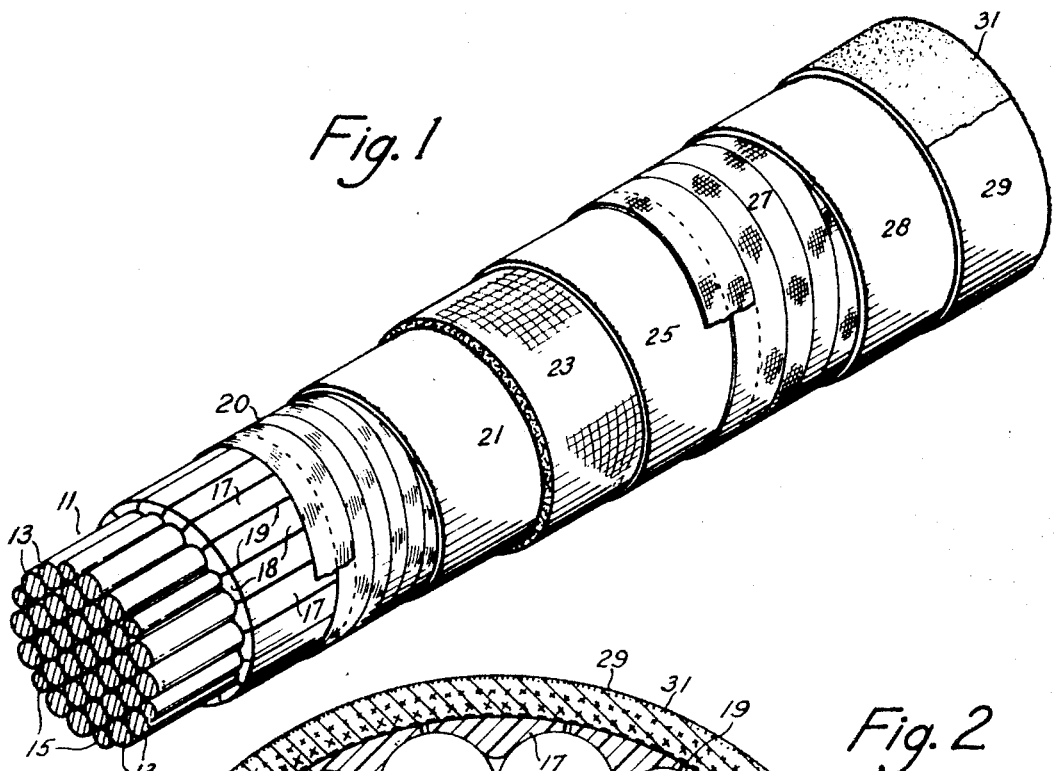
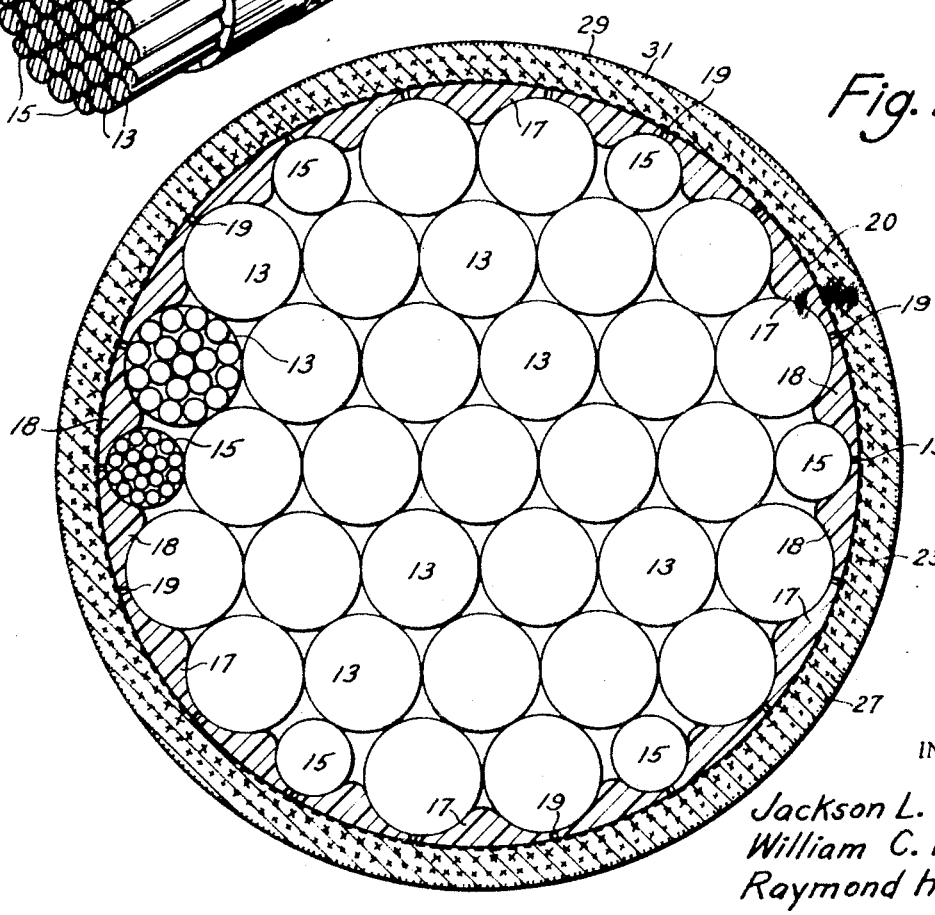
INVENTORS
Jackson L. Durkee
William C. Wall
Raymond H. Lester United States Patent Office 3,457,717
Patented July 29, 1969

3,457,717
PLASTIC COATED CABLE AND METHOD
OF MAKING SAME
Jackson L. Durkee, Bethlehem, Pa., William C. Wall, Wilmington, Del., and Raymond H. Lester, Bethlehem, Pa., assignors to Bethlehem Steel Corporation, a corporation of Delaware
Continuation-in-part of application Ser. No. 542,960, Apr. 15, 1966. This application Aug. 2, 1968, Ser. No. 749,639
Int. Cl. D07b 1/16, 7/14
U.S. Cl. 57—149   25 Claims

ABSTRACT OF THE DISCLOSURE

A structural cable is coated with a weatherproof plastic coating consisting of an inner layer of nonwoven glass fiber matting and an outer layer of woven cloth thoroughly impregnated and bonded together by an acrylic resin. A sheet of plastic underlies the glass fiber matting and plastic filler strips are used to fill in voids between the strands of the cable.

Cross references to related applications

This application is a continuation-in-part of application 542,960, filed Apr. 15, 1966, and now abandoned, which is itself a continuation-in-part of application 459,304, filed May 27, 1965, and now abandoned.

Background of the invention

This invention relates to coatings for metallic cables and more particularly to reinforced plastic coatings for structural cables and a method of producing such coatings.

As used herein, the term structural cable refers to a wire cable used as a substantially rigid permanent structural member. The plastic coating of the invention may be useful for weatherproofing cables for suspended roof structures, or guying cables for television towers and the like. It has, however, been found particularly useful as a coating for suspension bridge main cables. The invention will therefore be described hereinafter with respect to the weatherproofing of suspension bridge main cables.

The standard protective treatment for suspension bridge main cable has been to coat the cable in final position with red lead paste, and then to wrap the cable with a closely wound continuous binding of soft galvanized wire applied under tension, and finally to apply multiple coats of paint. This treatment has several serious disadvantages, the most serious of which is the leakage of water into the interior of the cable. Other disadvantages are the excessive weight of the coating and wrapping and the necessity for frequent repainting. In addition the wire wrappings cannot be applied to the cable until substantially the entire weight of the bridge is applied to it else the wire wrappings will separate as the cable stretches.

Summary of the invention

We have discovered that the objections to prior structural cable coating practices can be overcome by applying to such cables an inner layer of nonwoven glass fiber matting, an outer layer of woven or tightly bonded reinforcement, and impregnating both of said layers with acrylic resin and bonding them to each other to form a unitary structure.

Brief description of the drawings

FIGURE 1 is an isometric view of a suspension bridge cable coated according to the present invention with various sections broken away to show the various coating layers in their sequence of application.

FIGURE 2 is a diagrammatic cross section of a suspension bridge cable coated according to the present invention.

Description of the preferred embodiment

In the figures, a suspension bridge cable 11 is shown composed of strands 13, each formed of a plurality of wires. Between the outermost of the strands 13 smaller strands 15 are spaced to partially fill up the major interstices between the larger strands 13 and even out the surface of the cable. It is desirable before applying the coating to first remove any surface contamination from the metallic surface of the cable, for example with a suitable organic solvent such as methylchloroform. Over the large and small strands are placed molded plastic filler strips 17 and 18 each of which is respectively designed to fill up one interstice between two large strands 13 or one interstice between a large strand 13 and a small strand 15. Filler strips 17 and 18 are conveniently formed from any suitable plastic such as polyethylene by extrusion or other suitable process. Other materials or shapes for the filler strips are possible. For instance, the strips may be suitably designed so that each extends over more adjacent strands of the cable and thus fills more interstices between the strands.

The joints 19 between the filler strips may be butt-jointed as shown or may be lap-jointed if desired. It is ordinarily desirable to leave a slight clearance between the filler strips at the joints to allow for adjustment. A one-sixteenth of an inch clearance is usually sufficient. The joints 19 may be filled or caulked with some type of soft plastic material if desired. It is not necessary that the filler trips be formed from a weather resistant plastic such as methylmethacrylate or polytetrafluorethylene since they are to be covered with the weatherproof plastic outer layers. However, for applications where the cable covering may be damaged by physical agents or forces such as impact, it may be advantageous to form the filler strips from weather resistant plastic material and to caulk the joints 19 between the filler strips with a weather resistant putty material.

A binding of thin fiber glass adhesive tape has been found convenient to hold the filler strips in position. Springs or elastic cord may be used to temporarily position the filler strips in position until the adhesive tape is applied.

The plastic filler strips provide an even, resilient surface upon which to lay the outside coating. The resiliency of the plastic strips aids in relieving any shrinkage stresses which may occur as the outer plastic coating cures.

Over the plastic filler strips 17 and 18 is next preferably spiral-wrapped a sheet or strip of nylon or other suitable plastic 20 using approximately a 50% overlap. Plastic-wrapping 20 may be held in place by binding with fiber glass adhesive tape.

A heavy layer of acrylic resin syrup 21 is preferably next laid on or brushed over the plastic-wrapping 20 in any convenient manner.

An acrylic resin of the methacrylic ester family such as methylmethacrylate $CH_2{:}C(CH_3)COOCH_3$ is particularly suitable from the standpoint of weather resistance and cost. Other acrylic esters having good weather resistance characteristics and proper hardness may also be successfully substituted for the methylmethacrylate in the present invention. Methylmethacrylate is less expensive than polytetrafluorethylene, the only non-acrylic plastic having comparable weather resistance, is easier to bond and since it is available as a syrup is suitable for field application. Ethylacrylate is attractive from a cost standpoint but does not have as good weather resistance as methylmethacrylate. Copolymer systems of two or more acrylics may at times be useful. The preferred methylmethacrylate syrup, which can be purchased commercially, consists of a solution of polymethylmethacrylate (10% to 50% by weight) in monomeric methacrylate (90% to 50% by weight) with small amounts of desirable additions such as comonomers, and the like. The desired viscosity may be achieved by varying the proportions of polymer to monomer. The syrup flows on more easily, and cures or polymerizes into a better integral plastic layer if the viscosity is not too great, but the viscosity of the syrup must be high enough so that it does not immediately run off. Inorganic fillers such as fine clay and suitable pigments may be added to attain particular consistencies and colors.

Curing or polymerization of the methylmethacrylate monomer may be conveniently effected at ambient temperatures by a peroxide initiator and an amine accelerator. A suitable initiator is benzoyl peroxide and a suitable accelerator is dimethylparatoluidene. Depending upon the composition of the syrup and the rate of polymerization or curing desired, the benzoyl peroxide may ordinarily be added in amounts of .5 to 1.5% by weight and the dimethylparatoluidene may be added in amounts up to .5% by weight. Polymerization is very slow at normal atmospheric temperatures unless both the initiator and accelerator are present, so that a convenient procedure is to premix the initiator with one batch of methylmethacrylate syrup, and the accelerator with a second batch of methylmethacrylate syrup, and then mix the two batches together just prior to applying them to the cable. Substantially complete polymerization may conveniently occur in about two hours. The methylmethacrylate syrup should be applied liberally with a brush or spray gun. Its consistency should be such that it will build up a significant deposit. Sufficient syrup should be present to thoroughly impregnate the underside of the next to be applied layer of nonwoven glass fiber matting. A suitable methylmethacrylate syrup made especially for use with glass fiber reinforcing is manufactured by Du Pont under the trade name "Lucite" and is designated as "Lucite 205X syrup."

A layer of glass chopped-strand mat 23 or other suitable nonwoven glass fiber matting such as continuous strand nonwoven glass fiber matting is laid over the acrylic syrup layer. There are various nonwoven glass fiber matting materials commercially available of which the so-called chopped-strand mat and continuous strand mat are the most popular. Because of the short lengths of the component glass fibers chopped-strand mat is generally more uniform. We have therefore illustrated our invention by the use of chopped-strand glass fiber mat. Any other comparable nonwoven glass fiber matting which is absorbent and resilient is suitable for use in our invention, however.

Preferably the mat 23 may be applied in relatively wide sheets or strips. Thirty-six inch wide strips weighing 1 ounce per square foot have been found very satisfactory. There may be approximately a one-inch overlap of the edges of the mat 23 on the cable. It is important that the mat 23 be absorbent so that it will soak up a large amount of acrylic syrup. The mat may be preimpregnated with the acrylic syrup if desired and laid over an undercoating of acrylic resin or even a dry cable. Ordinarily, however, it is most satisfactory to lay the acrylic syrup directly upon the cable and place the mat 23 in a dry condition over the liquid resin. This prevents air from being entrapped below or within a preimpregnated mat with the resultant formation of bubbles. The mat 23 is pressed firmly against the cable after application.

A second layer of acrylic syrup 25 is next liberally applied to the outer surface of the mat 23 until it is thoroughly impregnated with the acrylic syrup. Several superimposed layers of mat may be used if desired so long as they are all thoroughly impregnated with the acrylic syrup.

Over the acrylic impregnated mat 23 is placed a woven or otherwise tightly bonded fibrous glass or synthetic reinforcement such as fiber glass cloth 27, preferably as a spiral tape wrapping using a 50% overlap. The glass cloth may be conveniently applied as 4 or 6 inch strips of woven selvage tape weighing approximately 10 ounces per square yard. The fiber glass cloth 27 is thinner, stronger and more dense than the mat 23. The acrylic resin syrup is applied to the glass cloth between the wraps as the cloth is being applied. It is definitely undesirable to apply the fiber glass cloth strips in a preimpregnated condition since the weave of the glass cloth may be close enough so that a wet or impregnated cloth will trap air underneath and form bubbles in the final plastic coating. After the completion of the tape wrapping, the outside of the tape is thoroughly coated with a layer 28 of acrylic resin syrup and the resin is allowed to cure either partially or completely. The acrylic syrup will ordinarily have been formulated to cure completely in approximately two hours but this may be varied depending upon conditions.

A final application of acrylic syrup is preferably applied to the outside of the resin impregnated and coated glass cloth 27 to form an outside or weather layer 29 and the coating is allowed to cure. The weather layer 29 may be lighter than the previous layers and may desirably be formulated to cure more quickly, e.g. in about one hour.

It is preferable to use a cold curing resin to coat the cable as no additional apparatus is then necessary to polymerize or cure the plastic on the bridge site. Where the cost of heating is not prohibitive, however, additional heat may be used to accelerate polymerization of the plastic. Additional heat may also be beneficial in cold weather. A heating blanket may, for instance, be used to accelerate the polymerization or curing rate if necessary. The curing rate will, of course, depend upon the formulation of the plastic, but ordinarily an external temperature of at least 40 degrees Fahrenheit is desirable. Since curing of the plastic itself generates heat, there may at times be an advantage in allowing the several layers of the coating to cure simultaneously rather than allowing each layer to cure separately. Sufficient heat will often be generated by such simultaneous curing to allow efficient curing or polymerization of the plastic at temperature as much as 20 degrees Fahrenheit below that temperature at which a single layer would cure at a comparable rate.

It is sometimes desirable to apply a finish layer 31 of acrylic syrup containing a sand or other granular material admixture over weather layer 29 upon the suspension bridge cable as this provides better footing for bridge workers and inspectors, and also may be considered to enhance the appearance of the coated cable. A suitable sand, e.g., standard "Ottawa" sand, graded to pass a No. 20 U.S. Sieve Series screen and be retained upon a No. 30 U.S. Sieve Series screen has proved to be satisfactory. The quantity of sand may be from 30% to 50% by weight of the total finish layer coating composition. Fine sand has been found to eliminate pin-holes in the outer finish plastic layer sometimes caused by coarser sand.

Any desirable colors may be added to the acrylic resin to form a permanently colored surface. The same basic acrylic syrup used for the fiber glass reinforced coating may be used for the weather layer but it may at times be desired to reduce the viscosity and this can conveniently be done by diluting with up to 25% methylmethacrylate monomer. Weather layer 29 of acrylic resin syrup may be applied with sand included in it if desired rather than applying a separate finish layer 31.

To produce a satisfactory coating it is essential to have the mat 23, thoroughly impregnated with the liquid plastic, placed under the glass cloth strips. Otherwise poor consolidation of the glass reinforced plastic coating about the surface of the cable is apt to be encountered.

It appears that the mat 23 acts as a sponge to soak up the acrylic syrup, effectively allowing a heavier coating of syrup to be applied to the cable, and releasing this syrup to the underside of the glass cloth tape as it is applied, thus assuring that the fiber glass layers are thoroughly impregnated with plastic and after polymerization securely bonding the plastic and fiber glass into a unitary whole. The resin impregnated mat 23 thus acts as a "soggy bed" or base upon which the wrappings of glass cloth are seated. Inspection of cross-sectional specimens of coatings produced without the application of the underlying plastic impregnated mat 23, indicates that the glass cloth may not be thoroughly wetted by the acrylic syrup with the result that the cloth is readily separated from the cured acrylic resin. With the use of the mat 23, however, the glass cloth and the acrylic resin are effectively fused to each other forming a unitary rather than a "laminated" acrylic resin-glass fabric structure.

In tests involving periodic applications and removals of loading stress to the coated cable it has been noted that cracking of the coating may occur when the underlying mat 23 is omitted. It will thus be clear that the use of the underlying mat 23 is an essential element of the present coating.

Plastic-wrapping 20 has been found to be very effective in allowing sleeve action of the finished plastic coating upon the underlying cable. This sleeve action allows differential expansion and contraction between the cable and the plastic coating and thus eliminates straining of the plastic coating which may result from sudden temperature fluctuations. The addition of the plastic-wrapping 20 is particularly effective in long cables. However, if a locking action is not detrimental, or is actually desired with a particular cable, plastic-wrapping 20 may be omitted and the acrylic resin allowed to run down into the interstices between the filler strips and/or between the wires of the cable.

Plastic-wrapping 20 is also effective in preventing the entrance of moisture into the cable prior to applying the outer acrylic layers, which moisture might otherwise be trapped within the cable under the outer plastic coating.

For convenience in showing the constituent phases, the outer acrylic coating shown diagrammatically in section in FIGURE 2 is depicted rather heavy. Actually, a completed coating 1/10 inch in thickness has been found very satisfactory.

Although the foregoing describes a preferred embodiment of the invention, certain modifications can be made therein. Thus, although the drawings show the outermost strands of the cable as being of two sizes this is not an essential feature and it is possible to use outer strands all of the same size, in which case the filler strips should be suitably modified.

Furthermore, if the cable is of parallel wire form wherein the individual wires are first laid up into separate strands and are then squeezed or compacted together to form a single large cable or single large mass of parallel wires, and thus already provides a substantially even outer surface, the filler strips are omitted and the outer coating laid directly upon the cable surface. The acrylic resin of the outer coating in this case will serve to fill up the small voids or interstices between the individual wires. Preferably, however, a parallel wire cable will also have a base covering applied, and this may take the form of a covering of sheets or tapes of a suitable plastic such as polyethylene or nylon secured to the cable by taping, or in any other suitable manner.

As an alternative the nonwoven mat and acrylic syrup may be deposited together on the surface of the cable in a single operation, to form an impregnated nonwoven glass mat without entrapped air bubbles, by the use of a spray gun designed to spray a heavy suspension of short glass fibers in acrylic resin syrup onto the surface of the cable, the underlying plastic sheeting, or the plastic filler strips. In this case, the suspension of glass fibers may be quite dense in order to provide a proper slightly resilient supporting underlayer for the outer wrappings.

The cable coating of the present invention may be conveniently applied to either new bridge cables, or to old bridge cables as a maintenance operation. Furthermore, the plastic coating may be applied to a new cable before the full weight of the bridge is applied to the cable, as the plastic coating will adjust itself to the stretching of the cable as the cable is loaded.

We claim:

1. A structural cable formed of a plurality of wires and a protective coating surrounding said cable, said protective coating comprising:
    (a) an inner layer of nonwoven glass fiber matting surrounding the cable,
    (b) an outer layer of woven reinforcement surrounding said matting and in contact therewith, and
    (c) an acrylic resin impregnating said inner and outer layers and bonding said layers to each other.

2. A structural cable according to claim 1 additionally comprising:
    (d) a layer of plastic sheeting surrounding the cable beneath said inner and outer layers.

3. A structural cable according to claim 2 additionally comprising:
    (e) a smooth surfaced somewhat resilient base covering surrounding the cable beneath said layer of plastic sheeting.

4. A structural cable according to claim 3 wherein said smooth surfaced somewhat resilient base covering comprises plastic filler strips.

5. A structural cable according to claim 1 wherein the outer layer of woven reinforcement is composed of fiber glass.

6. A structural cable according to claim 2 wherein the outer layer of woven reinforcement is composed of fiber glass.

7. A structural cable according to claim 4 wherein the outer layer of woven reinforcement is composed of fiber glass.

8. A structural cable according to claim 2 additionally comprising:
    (e) a surface coating of granular material admixed with acrylic resin.

9. A structural cable according to claim 4 additionally comprising:
    (f) a surface coating of granular material admixed with acrylic resin.

10. A structural cable according to claim 8 wherein said granular material comprises sand passing through a No. 20 sieve and retained on a No. 30 sieve of the U.S. Sieve Series in an amount equal to 30% to 50% by weight of the coating.

11. A structural cable according to claim 9 wherein said granular material comprises sand passing through a No. 20 sieve and retained on a number 30 sieve of the U.S. Sieve Series in an amount equal to 30% to 50% by weight of the coating.

12. A method of applying a protective coating to a structural cable comprising:
    (a) applying a nonwoven glass fiber mat to the surface of the cable,
    (b) applying a liquid acrylic resin to the mat to impregnate the mat,
    (c) applying a wrapping of woven reinforcement over the impregnated mat,
    (d) applying a coating of acrylic resin over the woven reinforcement, and
    (e) allowing the resin to set.

13. A method of applying a protective coating to a structural cable according to claim 12 wherein:
    (f) a layer of plastic sheeting is first applied to said cable.

14. A method of applying a protective coating to structural cable according to claim 13 wherein:
  (g) plastic filler strips are applied to the cable surface prior to the application of the plastic sheeting.

15. A method of applying a protective coating to structural cable according to claim 13 additionally comprising:
  (g) applying a surface coating of granular material admixed with acrylic resin over the outside of the coating.

16. A method of applying a protective coating to structural cable according to claim 15 wherein said granular material comprises sand passing through a No. 20 sieve and retained on a No. 30 sieve of the U.S. Sieve Series in an amount equal to 30% to 50% by weight of the coating.

17. A method of applying a protective coating to structural cable according to claim 14 additionally comprising:
  (h) applying a surface coating of granular material admixed with acrylic resin to the outside of the coating.

18. A method of applying a protective coating to structural cable according to claim 17 wherein said granular material comprises sand passing through a No. 20 sieve and retained on a No. 30 sieve of the U.S. Sieve Series in an amount equal to 30% to 50% by weight of the coating.

19. A method of applying a protective coating to a structural cable comprising:
  (a) applying a coating of liquid acrylic resin to the outer surface of the cable,
  (b) applying a nonwoven glass fiber mat over the acrylic resin,
  (c) thoroughly impregnating the mat with liquid acrylic resin,
  (d) applying a wrapping of woven reinforcement over the impregnated mat,
  (e) applying a coating of acrylic resin over the woven reinforcement, and
  (f) allowing the resin to set.

20. A method of applying a protective coating to structural cable according to claim 19 wherein:
  (g) the first coating of liquid acrylic resin is applied integrally with the nonwoven glass fiber mat.

21. A method of applying a protective coating to structural cable according to claim 19 wherein:
  (g) a smooth resilient base covering is first applied to the cable.

22. A method of applying a protective coating to structural cable according to claim 21 wherein:
  (h) the resilient base covering is comprised of plastic filler strips.

23. A method of applying a protective coating to structural cable according to claim 22 wherein:
  (i) the plastic filler strips are wrapped with a plastic sheeting before applying the acrylic layers.

24. A method of applying a protective coating to structural cable according to claim 19 wherein:
  (g) a layer of plastic sheeting is first applied to said cable.

25. A method of applying a protective coating to structural cable according to claim 20 wherein:
  (h) a layer of plastic sheeting is first applied to said cable.

References Cited

UNITED STATES PATENTS

| | | | |
|---|---|---|---|
| 2,095,721 | 10/1936 | Sunderland | 14—22 |
| 2,105,362 | 1/1938 | Nowak et al. | 117—75 |
| 2,234,560 | 3/1941 | Keyes | 174—121 |
| 2,315,736 | 4/1943 | Rosch | 174—107 |
| 2,370,046 | 2/1945 | Keyes | 174—120 |
| 3,080,893 | 3/1963 | Craycraft | 138—141 |

FOREIGN PATENTS 692,480    6/1953    Great Britain.

ROBERT F. BURNETT, Primary Examiner

J. D. FOSTER, Assistant Examiner

U.S. Cl. X.R.

14—22; 57—162; 117—75, 128.4; 156—171, 172, 184; 161—47, 78, 83, 87, 93